May 23, 1967     J. C. PRICE     3,321,110

LIQUID SPRAYER

Filed May 14, 1965

INVENTOR.
JAMES C. PRICE

BY Fraser & Boguski

ATTORNEYS

United States Patent Office 3,321,110
Patented May 23, 1967

3,321,110
LIQUID SPRAYER
James C. Price, 733 S. Taylor Ave.,
Montebello, Calif. 90640
Filed May 14, 1965, Ser. No. 455,803
7 Claims. (Cl. 222—389)

The present invention relates to liquid dispensing systems, and more particularly relates to portable systems for spraying liquids in minute dispersions.

The widespread uses of liquid spray systems extend to insecticides, paints, cleaners and a variety of other media. Many such systems are driven from a prime source of power that operates a compressor to pressurize the contents of a reservoir and drive the liquid out through a nozzle or similar constriction. The compressed gas typically is mixed with the liquid to assure dispersion and flow through a turbulent action. For many applications, however, substantial advantages are derived by what is often termed "airless spraying," in which the liquid being dispensed is ejected alone. The airless sprayer provides superior control over the spray itself and generally affords more efficient use of the liquid. Such a system, however, requires a reservoir and valving system suitable for establishing and communicating the needed pressures.

Although the present invention is applicable to a wide variety of other uses, as described below, it has particular utility as a portable airless sprayer for insecticides. For insect extermination, pest preventive applications and other pest control purposes, it is extremely effective to generate a cloud of a liquid insecticide by creating a dispersion of sufficiently minute particles. When used in this manner, a petrochemical such as kerosene provides a very effective medium. If the liquid is forced through a small nozzle in the absence of air and under adequate pressure, a cloud or fog-like dispersion is created. This dispersion continues for an appreciable length of time. Because such a cloud distributes widely and freely and remains for a substantial length of time in the atmosphere, it is extremly effective in controlling insects and other pests. The dispersion has the added advantage that it can be generated in parts of buildings to which access is limited, such as under houses, within walls, and in small confined areas of woodwork without necessitating saturation of building material or household items and subsequent damage of clothing, furniture, equipment or exposed property. Similarly, such dispersions can be selectively generated for fields containing cultivated crops and plants and will accomplish the intended purpose without harmful effects to the plants to be protected.

It is highly desirable to be able to generate this type of spray through the use of a unit which is sufficiently portable so that it can be carried and handled conveniently by a single operator. The operator can then move freely through rooms or fields and quickly create the fog-like dispersion in the particular regions in which it is needed. Prior art structures of this type have utilized relatively heavy cylinders containing a free moving piston. In such prior art structures, the desired amount of liquid is placed on one side of this piston, and gas under a given high pressure is maintained on the other side of the piston. A high starting pressure, such as 1,000 p.s.i., is maintained when the full amount of liquid is present. The cylinder for such amount is typically in the form of a steel cylinder having a central body, separate flat end caps and external support rods joining the end caps and unifying the structure. Such a unit typically weighs in excess of twenty-seven pounds when fully loaded with one-half to a gallon of liquid. An operator cannot conveniently handle this weight for any appreciable length of time. Moreover, the equipment is difficult to manipulate in view of its bulk and weight. Each such unit is generally handmade, each part being precision machined, in order to permit operation of the unit for a period of years without internal maintenance. These factors appreciably increase costs.

Pressures of the order of one thousand pounds, such as are generally used in conventional airless liquid spray units, require the use of a compressor system and thereby limit the portability of the device because of its dependence on a power-driven compressor. Hand filling by simple mechanisms would be less expensive and far more versatile.

It is therefore an object of the present invention to provide a light weight and inexpensive portable airless sprayer.

A further object of the invention is to provide a portable airless liquid sprayer having extremely long life but fabricated with a highly reliable and simple mechanism.

A further object of the present invention is to provide a portable airless sprayer having a minimum number of parts, and capable of being recharged by hand-operated equipment.

These and other objects are achieved by devices in accordance with the invention that utilize a light weight spun cylinder having a smooth finished internal surface and hemispherical ends. The cylinder incorporates a free floating internal piston having a hollow interior, including an open-ended skirt having a number of circumferential grooves, and a hemispherical head portion configured to mate with one end of the cylinder. A groove in the piston provides communication between the outer and inner portions, and sealing rings are disposed in the piston so as to hold the piston away from the cylinder walls. Pressurized gas containing a lubricating oil is forced into the end of the cylinder facing the open-ended skirt portion of the piston. The liquid to be sprayed is injected into the other end. The circumferential grooves and sealing rings not only hold the piston away from the cylinder walls, but also prevent intermixing of the gas and the liquid, and lubricate the piston so as to avoid the possibility of abrasion of the inner surface of the cylinder surface. The head end of the free floating piston optionally includes a terminal slot. This slot provides a recess into which liquid between the head end of the piston and the adjoining surface of the cylinder can run as the head end of the piston reaches its closest approximation with such cylinder surface. Such an arrangement is preferred in order to allow pressure gauges at the head end of the cylinder to register zero, indicating complete emptying of the major space between the cylinder and piston head.

Another feature of this device is the utilization of a largely integral spun cylinder of aluminum alloy. This construction requires no external reinforcing structure, and withstands the required pressures with an adequate margin of safety. Further, a reduction in weight is achieved which permits substantial increases in the amount of liquid, if desired, and alternatively increases operator mobility for the same amount of liquid.

Another feature of the device in accordance with the invention is the utilization of pressures substantially less than one-half those previously thought necessary to accomplish the same purposes. It has now been found that an adequately minute particle size liquid dispersion is obtained through the use of the present airless sprayer even though the starting pressure of the sprayer is only approximately 300 pounds per square inch.

A better understanding of the invention may be had by reference to the following description, taken in conjunction with the accompanying drawings, in which.

Figure 5:
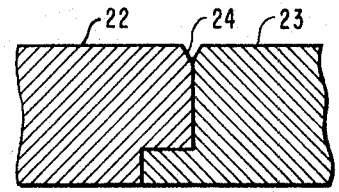
FIG. 5 is an enlarged sectional view of a fragment of the cylinder of FIG. 2.
Figure 1:
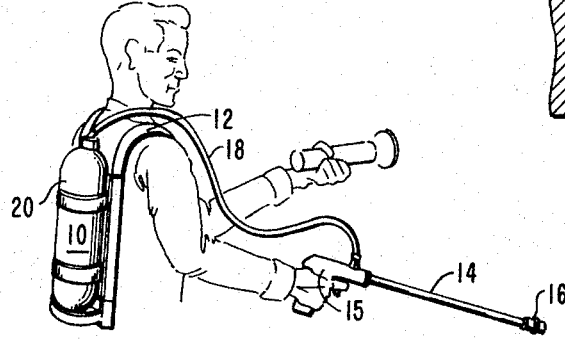
FIG. 1 is a partial perspective view of one arrangement of a portable airless sprayer in accordance with the invention, showing the manner in which it is used.
Figure 4:
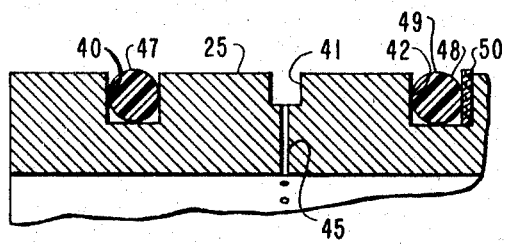
FIG. 4 is an enlarged sectional view of a fragment of the piston of FIGS. 2 and 3.
Figure 3:
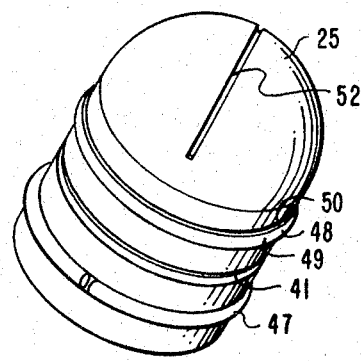
FIG. 3 is a perspective view of the free floating piston employed in the mechanisms of FIGS. 1 and 2.
Figure 2:
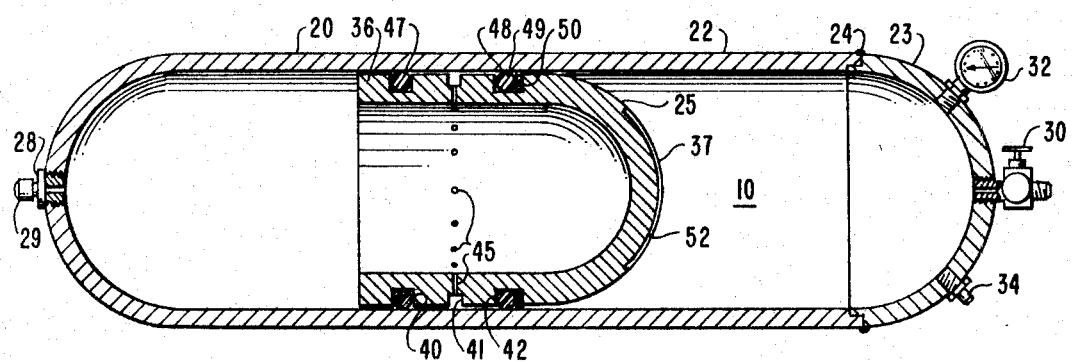
FIG. 2 is a side sectional view of the mechanism of FIG. 1.

A light weight, low cost airless portable sprayer 10 in accordance with the invention is shown in FIGS. 1 and 2, with details being shown in FIGS. 3 to 5. The sprayer device 10 is primarily intended for insecticide uses, for which portability and ease of handling are of substantial importance. An operator straps the device on his back by means of a harness 12, as shown generally in FIG. 1, and walks through the area in which application is desired. A spray wand 14 having a pistol grip and control 15 at one end and an associated spray nozzle 16 at the other is coupled to a fitting on the sprayer 10 by a high pressure hose 18. The operator directs the spray wand 14 with one hand while keeping the other hand free for other purposes, such as the use of a flashlight, the manipulation of other equipment or the removal of interfering objects.

The operative parts of the sprayer system 10 are contained within or mounted upon a cylindrical tank 20 specially formed from a tube of high strength, light weight material 22, such as aluminum alloy, and an end cap 23 of similar material. The tube portion 22 is first spun to provide a hemispherical end, this being closed and used in the present example as the gas confining end of the tank 20. The end cap 23 may be formed to hemispherical shape by spinning from a plate, and is then welded to the tube portion 22 along a circumferential joint line 24. The inner diameter of the tank 20 is bored to a specific dimension, and then is preferably highly honed and polished. A mirror finish is highly preferable, but the smoothness and finish may also be enhanced by the use of surface anodizing or coating. It is also feasible to utilize a low friction inert synthetic material, such as tetrafluoroethylene, as a liner for the inner surface of the tank 20. Both leakage and corrosion are reduced by the anodizing and coating processes. A free floating piston 25 is contained within the tank 20.

The joint line 24 at which the end cap 23 is preferably welded to the main tube portion 22 of the cylinder is perferably undercut (FIG. 5). This configuration for the joint line 24 permits the end cap 23 to be removed for internal maintenance of the tank 20 and piston 25 after lengthy use, and to be re-machined and re-installed without appreciable loss of length and without sealing problems. The internal surface of the end cap 23 does not provide a bearing surface for the piston 25, and therefore need not be polished, although it should be machined. Moreover, the means (O ring) by which the piston 25 slides in the cylinder 20 is positioned so that it cannot contact the joint line 24. Accordingly, there is no necessity that the joint line 24 be perfectly smooth.

The pressurized gas end of the principal portion of the tank 20 (the end opposite from that containing the joint line 24) is tapped and threaded to receive a nitrogen filler check valve 28, typically of brass or steel. This valve 28 closes the open end remaining if the hemispherical end is spun from a tube. Usually, the nitrogen check valve 28 is employed with a dust prevention cap 29 when the sprayer 10 is in use. This cap 29 is removed for the attachment of a fitting from a pressurized gas source (not shown) when it is desired to develop pressure in the chamber.

At the liquid end of the tank 20, a hole is tapped and threaded for insertion of a liquid filler and shut-off valve 30, generally of brass or the like material. It is preferred to employ a manual gate or needle valve 30 for this purpose. The hemispherical end cap 23 also includes a pressure gauge 32 fitting into a drilled and tapped hole on one side and a similarly inserted spray hose connection 34 fitting at another point, as shown in FIG. 2.

The piston 25 itself is best seen in FIGS. 2, 3 and 4 and comprises a generally dome shaped member having a circumferential skirt portion 36 and a hemispherical head 37, which may also be referred to as the forward end on the piston. The piston 25 has a hollow interior, with the skirt 36 open to the pressurized gas end of the cylindrical tank 20, and the head 37 substantially mating with the end cap on the tank. The outer diameter of the cylindrical skirt 36 is closely machined to a dimension which is only slightly less than that of the inner diameter of the tank 20. The hemispherical head portion 37 of the piston 25 registers closely with the inner surface of the end cap member 23 of the cylindrical tank when the piston 25 is in its extreme position toward the liquid end of the tank 20 i.e. in engagement with the end cap member 23.

The skirt 36 includes three spaced apart circumferential grooves 40, 41, 42, the intermediate one 41 of which has at least a pair of radial apertures 45 providing communication between the interior of the piston 25 and the inner wall of the cylindrical tank 20. The first and third grooves 40, 42 which may also be referred to as the rear and forward grooves, respectively, receive piston rings 47 and 48 in the form of O rings. The first or rear ring 47 is preferably a neoprene ring which serves largely for physical stabilization of the piston 25. The third or forward O ring 48 is preferably a composite element, having a round preferably neoprene portion 49 and a flat preferably rubber or leather portion 50. The flat portion 50 is used as a backup for the ring 49, and assures better sealing in that area to prevent a mixing of liquid and gas from opposite sides of the ring 49. The backup element 50 also provides a wiper action for lubricating fluid. As previously noted, the backup element 50 and ring 49 are situated sufficiently far towards the rear of the skirt 36 so as to avoid contact with the joint line 24.

The forward hemispherical end 37 of the piston 25 may also include a slotted portion 52 extending across the tip thereof and, in registry with the liquid filler and shutoff valve 30, the gauge 32 and the connection 34 to provide a small but positively defined volume for residual liquid on the outer surface of the forward end 37 of the piston 25 and the inner surface of the end 23 when the piston 25 is in engagement with the end 23 of the cylindrical tank 20.

Force exerted by a pressurized gas, such as nitrogen, constantly urges the piston 25 in the direction toward the liquid end (end 23) of the tank 20 during operation of the device. A feature of the invention is the use of a pressurized gas containing a quantity of lubricating oil uniformly dispersed therein. Although the oil largely collects on the piston 25 and the walls of the tank 20, a measurable amount remains dispersed in the pressurized gas. The lubricating oil thus provides a constant oil barrier between the piston 25 and the tank 20 walls. This arrangement minimizes wear so that the device is capable of extremely reliable operation over very long periods of time, such as 3–5 years, without the need for disassembly or internal maintenance. The piston 25 floats freely within the tank 20, even though a very close tolerance exists. The rings 47 and 48 (49 and 50) assemblies stabilize the position of the piston 25 and hold it away from the tank 20 walls, while at the same time sealing the gas and liquid from each other in all positions of the piston.

When operating the device over substantial periods of time, it is periodically discharged to zero gas pressure. This is in order to permit the return of the piston 25 to the gas entry end and to assure complete wiping of the tank 20 wall. To fill the tank, the gas pressure is raised to a desired pressure level, with the liquid end empty. The desired pressure level, in accordance with the invention, is of the order of about 150 p.s.i., a level which can be achieved readily by existing tank storage units and other conventional sources. The kerosene or other liquid insecticide to be sprayed is then forced under pressure into the liquid end through the filler valve. The piston 25, which is impelled toward the liquid end of the tank 20 when gas pressure is first introduced, is thus forced rearwardly for a distance sufficient to receive the desired quantity of liquid, usually one-half gallon. For a tank 20 of 18½" cylinder length with a cylinder inner diameter of 4.562", and hemispherical ends as shown, one-half gallon almost exactly fills half of the tank, thus increasing the gas pressure to 300 p.s.i. This fact is significant, because hand operated pumps can inject the needed liquid quantity within a relatively short interval when manipulated by a single operator. Electric or gasoline powered pumps may, of course, be used if desired.

The weight of this unit empty may be as little as 7 or 8 pounds, and when fully loaded is substantially less than conventional units. As shown in FIG. 1, the unit may be carried comfortably and easily on a back pack harness by an operator, with the spray nozzle 16 mounted on the spray wand 14 of the pistol grip operated type. A suitable commercial spray wand is sold by Sprayer Systems Company as "Gun Jet 22 Spray Adjustable," with the nozzle being designated .30–206. The indicated pressure level (about 100 to about 500 p.s.i.) rapidly and easily provides, with this combination, a very fine spray mist of extremely large volume per unit weight, so that the liquid is very slowly dispensed, for example, at a rate of approximately one-half gallon per hour, yet for an extremely large total volume of mist. It had previously been thought that substantially higher pressures of the order of 1000 p.s.i. and providable only with side pressure means were needed for atomization of the liquid to the desired fine dispersion, but the present unit provides the desired spray effect with the indicated drastically reduced pressures and without the requirement of a separate pressure source connected thereto.

Moreover, the reduced pressures experienced with the present unit permit better control of the rate of dispersion, a substantially lower unit weight, and a much longer spray interval for a given liquid quantity. One operator can readily handle the entire unit and, as shown in FIG. 1, can utilize the spray wand 14 with one hand, leaving the other hand free for other uses.

In actual practice, the tank 20 has been made of aluminum alloy type 5456, with an inner diameter of 4.562" and a wall thickness of ⁷⁄₁₆". The inner surface of the tank 20 has been honed, polished and anodized, and both hemispherical ends have been spun to the desired shape. The O rings have been made of neoprene and a neoprene and leather combination, respectively.

While there have been described above and illustrated in the drawings various modifications of liquid spray devices in accordance with the invention, it will be appreciated that a number of other modifications and alternatives are possible, and the invention should be considered to include all variations falling within the scope of the appended claims.

What is claimed is:

1. A high pressure airless liquid sprayer system comprising a hollow generally cylindrical tank having generally hemispherical hollow end portions and a substantially smooth inner surface of like configuration; a free floating piston inside the tank, and having a hollow cylindrical skirt portion and a hemispherical end portion facing a first interior end of the tank and closely conforming in size and configuration thereto, the skirt portion including circumferentially spaced grooves, at least one of said grooves providing communication to the interior of said piston; means seated within the remaining grooves of the piston including a groove nearer said first end of the tank than said communicating groove, for engaging the inner surface of the cylindrical tank; means comprising a pressurizing gas which includes a lubricating oil disposed in the second interior end of the tank and in the interior of said piston; a liquid medium to be sprayed disposed in the first interior end of the tank; and spray means coupled into and communicating with the first interior end of the tank.

2. A high pressure airless liquid sprayer system comprising a hollow generally cylindrical tank having hollow hemispherical end portions and a hollow cylindrical body of a given interior dimension; a hollow cylindrical free floating piston inside the tank, the piston having one hemispherical end slightly smaller than said hemispherical end portion adjacent thereto and one open ended hollow cylindrical skirt portion having a diameter slightly smaller than said body and including three circumferential spaced apart grooves therein, the intermediate groove communicating between the adjacent inner surface of said body and the hollow interior of the piston; ring means disposed within the remaining grooves of the piston and contacting the inner surface of said body; a liquid to be sprayed disposed in the region between the hemispherical end of the piston and the adjacent end of the cylinder; and a gas under pressure and including a dispersion of lubricating oil disposed in the opposite end of the cylinder and in the interior of the piston.

3. The high pressure airless liquid sprayer system of claim 2 wherein the ring means most adjacent the hemispherical end of the piston includes a ring substantially circular in cross section and a ring substantially rectangular in cross section, the latter disposed as a liquid gas seal between said circular ring and said hemispherical end of said piston.

4. A portable airless liquid spray device for insecticidal spray use and similar applications comprising a spun hollow cylindrical tank member having one substantially closed hollow hemispherical end and an open end, the inner surface of the tank member having a mirror finish; a hollow hemispherical end cap member joined to the open end of the tank member and forming a closed tank therewith; an internal free moving piston disposed within the closed tank, and including a hollow cylindrical skirt slightly smaller in outer diameter than the inner diameter of the tank member and a hollow hemispherical end facing the end cap member, at least a pair of spaced apart O rings disposed in and protruding from the skirt in direct contact with said inner surface of the tank member for sliding engagement of the piston therein, the skirt defining an aperture between the O rings and communicating between the inner surface of the tank member and the hollow interior of the piston; gas valve means disposed in and closing the hemispherical end of the tank member; and liquid valve means disposed in the hemispherical end cap member and communicating with the interior thereof.

5. The device of claim 4 wherein pressurized gas is disposed in the hemispherical end of the tank member and liquid is disposed between the hemispherical end cap member and the hemispherical end of the piston.

6. The device of claim 5 wherein the gas includes a dispersion of lubricating oil and wherein the hemispherical end of the piston defines a slot in registry with the liquid valve means.

7. A portable airless liquid spray device for insecticidal spray use and similar applications comprising a spun hollow cylindrical tank member having one hollow hemispherical end and an open end, the inner surface of the cylindrical portion of said tank member having a specified dimension and a smooth finish; a hollow hemispherical end cap member welded to the open end of the tank member and forming a closed tank therewith; both said tank member and said end cap member being aluminum alloy and at least the tank member having an anodized inner surface, the tank member defining a pressurized gas portion of the device, and the end cap member defining a liquid-containing portion of the device; an internal free moving piston disposed within the closed tank and including a cylindrical hollow skirt slightly smaller in outer diameter than the inner diameter of the tank member, the piston also including a hemispherical hollow end facing the end cap member and containing a slot across the tip thereof, said skirt and hemispherical end defining a hollow inner portion, and the skirt including three circumferential grooves spaced apart, the intermediate one of the grooves including at least a pair of radial apertures communicating with the hollow interior of the piston, a first neoprene O ring disposed in the groove closest the cylindrical skirt of the piston and in contact with the inner wall of the tank member, and a second O ring body disposed in the groove closest the hemispherical end of the piston, the second O ring body including a rearward neoprene O ring of generally circular cross section and a forward leather backup ring of generally rectangular cross section, the O ring bodies holding the piston out of contact with the tank member wall and sealing the pressurized gas portion of the device from the liquid-containing portion of the device, the gas on one side of the piston being maintained out of contact with the liquid on the other side thereof, said O ring also providing a lubricant wiping action along the inner surface of the tank member; means providing a gas passageway at the gas pressure end of the tank member; a pressurized gas in the gas pressure end of the closed tank at a pressure of about 100–150 p.s.i., and including lubricating oil therein; liquid to be dispensed disposed in the liquid-containing portion of the closed tank; and liquid valve means maintained in the hemispherical end cap member and communicating with the interior thereof.

References Cited by the Examiner

UNITED STATES PATENTS

| | | | |
|---|---|---|---|
| 1,158,904 | 11/1915 | Dunbar | 222—389 |
| 1,207,752 | 12/1916 | Harrison | 222—389 |
| 3,043,340 | 7/1962 | Rehbock | 222—389 X |
| 3,097,768 | 7/1963 | Tasca | 222—389 |
| 3,217,932 | 11/1965 | Steiner | 222—389 X |

ROBERT B. REEVES, *Primary Examiner.*

STANLEY H. TOLLBERG, *Examiner.*